D & A. McC. Shaeffer.
Bee Hive.
Nº 72918.    Patented Dec. 31, 1867.

Witnesses.
Chas. A. Pettit
Geo. W. Rockwell

David Shaeffer
and
Aaron McCabe Shaeffer
By Munn & Co.
Attorneys.

United States Patent Office.

DAVID SHAEFFER AND AARON McCABE SHAEFFER, OF CENTREVILLE, IOWA.

Letters Patent No. 72,918, dated December 31, 1867.

IMPROVEMENT IN BEE-HIVES.

The Schedule referred to in these Letters Patent and making part of the same.

TO ALL WHOM IT MAY CONCERN:

Be it known that we, DAVID SHAEFFER and AARON McCABE SHAEFFER, of Centreville, in the county of Appanoose, and State of Iowa, have invented a new and useful Improvement in Bee-Hives; and we do hereby declare the following to be a full, clear, and exact description of the same, reference being had to the accompanying drawings, forming part of this specification, and in which—

Similar letters of reference indicate corresponding parts in the several figures.

Figure 2:
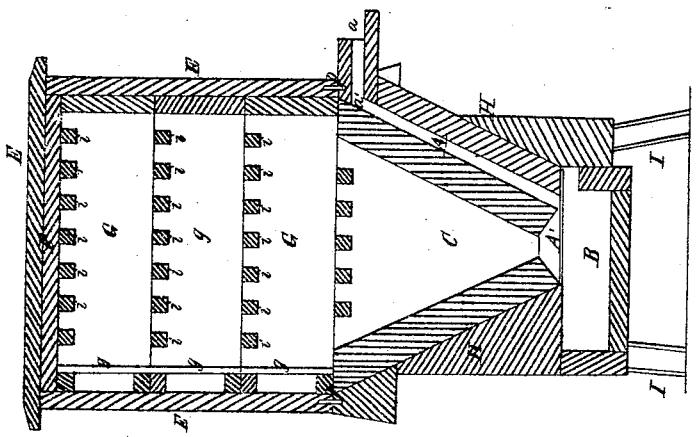
Figure 2 is a vertical longitudinal section of the same.
Figure 3:
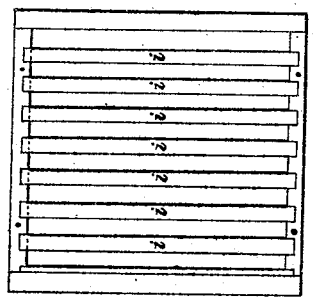
Figure 3 is a top view of the removable boxes G G' G''.
Figure 1:
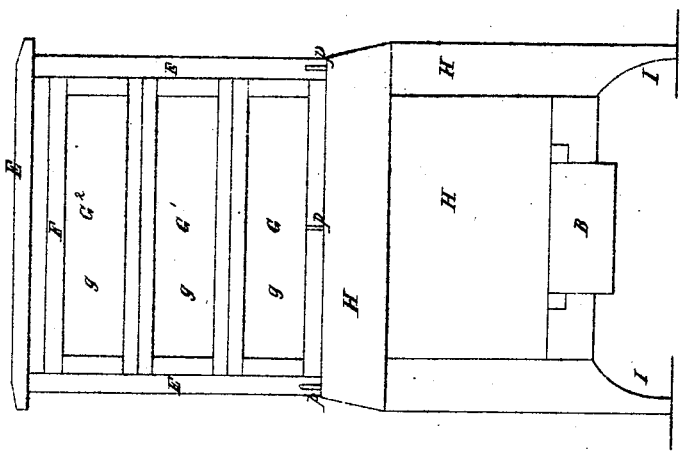
Figure 1 is a rear elevation of our invention, the outside cover being removed.

This invention contains a new device for protecting the honey from the approach of moths and millers, and a new and improved arrangement of the several parts of the hive.

In order that others skilled in the art to which my invention appertains may be enabled to make and use the same, I will proceed to describe it in detail.

In the drawings, A represents the entrance to the hive, extending horizontally from a point, $a$, eighteen or twenty inches from the body of the hive to the point $a'$, then turning downward at an angle of sixty or seventy degrees, and communicating at its lower extremity with the space A' inside of the hive, and below the hopper-shaped chamber C. D is a sliding box or drawer at the bottom of the hive, for the purpose of receiving and removing the offal, &c., that may fall from the chambers above. E is a removable cover or box placed over the honey-chamber, and held in position by pins $p\ p$. G G$^1$ G$^2$ are removable boxes, in which the honey is made, provided on one side with glass windows $g\ g\ g$, through which the condition of the honey and bees may be observed without disturbing the boxes, and at their top furnished with parallel slats $i\ i\ i$ for the purpose of affording a support to the comb, and of separating the chambers formed by the boxes. F is a removable cover attached to the top of the upper box. When it is ascertained, by observation through the windows $g\ g$, that the upper box is filled with honey, it is to be removed, emptied, and placed at the bottom. Its cover F having been transferred to the middle, now become, in its turn, the upper box, and so on as the successive boxes are filled. These boxes are held in position in the same manner as the cover E. The entrance-passage A is long, flat, and wide, and the aperture at the bottom of the hopper C is quite narrow. By this means it will be almost impossible for the miller to follow the bees into the hive, and even if it should do so, both it and its moth would be unable to rise through the hopper-shaped chamber C to the honey-chamber. The removable cover or enclosing-box E is employed to protect the hive from the weather and from attacks of the moth or miller. H is the frame or body of the hive surrounding the chamber C, and resting on the legs I I.

Having thus described our invention, what we claim as new, and desire to secure by Letters Patent, is—

The arrangement of the entrance A, drawer D, chamber C, and removable boxes G G$^1$ G$^2$, in connection with the enclosing-box E and frame H, substantially as described.

To the above specification of our improvement, we have signed our hands this day, 12th of June, 1867.

DAVID SHAEFFER,
A. McSHAEFFER.

Witnesses:
JOHN N. MASON,
JAS. H. LEE.